United States Patent [19]

Kumazawa et al.

[11] Patent Number: 4,857,722
[45] Date of Patent: Aug. 15, 1989

[54] APPARATUS FOR STABILIZING THE AMPLIFICATION DEGREE OF PHOTOMULTIPLIERS

[75] Inventors: Yoshihiko Kumazawa; Tsunekazu Matsuyama, both of Kyoto, Japan

[73] Assignee: Shimadzu Corporation, Kyoto, Japan

[21] Appl. No.: 165,194

[22] PCT Filed: Aug. 28, 1986

[86] PCT No.: PCT/JP86/00440

§ 371 Date: Dec. 28, 1987

§ 102(e) Date: Dec. 28, 1987

[87] PCT Pub. No.: WO88/01751

PCT Pub. Date: Mar. 10, 1988

[51] Int. Cl.$^4$ .......................... G01T 1/20; H01J 40/14
[52] U.S. Cl. ................... 250/207; 250/363.07
[58] Field of Search ............ 250/213 VT, 207, 363 S, 250/369, 363.06, 363.07, 363.09; 378/19, 62

[56] References Cited

U.S. PATENT DOCUMENTS

| | | | |
|---|---|---|---|
| 3,745,345 | 7/1973 | Muehllehner | 250/363 S |
| 4,223,221 | 9/1980 | Gambini et al. | 250/363.07 |
| 4,256,960 | 3/1981 | Snider | 250/363.07 |
| 4,274,002 | 6/1981 | Tomita | 250/363.07 |
| 4,507,733 | 3/1985 | Blum | 250/363 S |
| 4,566,074 | 1/1986 | Nishikawa | 250/369 |
| 4,578,810 | 3/1986 | Stoub | 250/369 |
| 4,583,187 | 4/1986 | Stoub | 250/363 S |
| 4,616,129 | 10/1986 | Yamada | 250/207 |
| 4,661,909 | 4/1987 | Kumazawa et al. | 250/363.07 |

FOREIGN PATENT DOCUMENTS

| | | |
|---|---|---|
| 59-143981 | 8/1984 | Japan . |
| 61-038587 | 2/1986 | Japan . |
| 61-50088 | 3/1986 | Japan . |
| 61-162782 | 7/1986 | Japan . |

*Primary Examiner*—David C. Nelms
*Assistant Examiner*—Michael Messinger
*Attorney, Agent, or Firm*—Griffin, Branigan, & Butler

[57] ABSTRACT

In an apparatus for automatically stabilizing the amplification degrees of photomultipliers (PMT's) in a detector having a scintillator and a plurality of PMT's, the PMT's (3) are classified into groups (A, B, C and D) and arranged such that the PMT's of the same group are not disposed adjacent to each other. Outputs taken from the PMT's (3) are classified according to the groups and summed in adders (6) allotted to the respective groups. A sum signal taken from a group which includes a PMT disposed closest to a scintillation is analyzed by a pulse height analyzer (14). The outputs from the pulse height analyzer are collected in a counter memory (15) as statistical data on a change in the amplification degrees of PMT's. Data on the high voltage to be applied to each PMT (3) is recorded beforehand in a register (17) and this data is corrected by a data processing circuit (16) in accordance with the statistical data. The data on the amplification degree of each PMT can be collected in parallel so that the amplification degree of each PMT (3) may be stabilized in a short time.

6 Claims, 4 Drawing Sheets

APPARATUS FOR STABILIZING THE AMPLIFICATION DEGREE OF PHOTOMULTIPLIERS

TECHNICAL FIELD

The present invention relates to an apparatus for automatically stabilizing the amplification degrees of photomultipliers (hereinafter called "PMT's" for short) in a detector, such as a scintillation camera, for detecting the position of a radioactive ray, said detector comprising a scintillator and a plurality of PMT's.

TECHNICAL BACKGROUND

The amplification degrees of PMT's, which are used in a detector, such as a scintillation camera, for detecting the position of a radioactive ray, become unequal to each other when these amplification degrees change with the passage of time. The deterioration of spatial resolution and energy resolution also results from such a change in the amplification degrees with the passage of time. To cope with these disadvantages, the following countermeasures have been proposed:

The first of them (Japanese notified patent application No. 55-19511 and Japanese laid-open patent application No. 58-9082) proposes that a reference light source such as a light emitting diode, which is to emit reference light, should be provided in a light guide so that an output may be taken from PMT's on the basis of the reference light and the high voltage applied to the PMT's may be adjusted on the basis of this output so as to stabilize the amplification degrees of the PMT's.

The second countermeasure (Japanese laid-open patent application No. 57-59184) proposes that a radiation source be allowed to lie on the central axis of one PMT after another in order to collect data for use in the correction of amplification degrees which have undergone a variation.

The third countermeasure (Japanese laid-open patent application No. 59-143981) proposes that a change in the amplification degrees of PMT's be found from an energy signal taken from the scintillation camera.

A fourth proposal by the present applicant in a prior application (i.e., in Japanese laid-open patent application No. 61-50088), is characterized in that a reference output is predetermined for the output of each PMT and that, when a scintillation occurs in a certain position, a reference output which ought to be taken from a PMT disposed closest to that position is compared with an actual output in order to obtain data on a change in the amplification degree of the PMT.

The first proposal has the disadvantage that the reference light per se, which is to be emitted by the reference light source is liable to be affected by a temperature change, secular change, etc.

The second proposal has the disadvantage that complicated work must be done if data is to be manually collected, while jigs are required if data is to be automatically collected. In either case, it takes much time to collect the data.

The third proposal has the disadvantage that data acquisition alternating with correction has to be repeated and that data obtained may not converge in some cases.

Although the fourth proposal is superior to the first to third proposals in that the defects of the latter are corrected by the former, the fourth proposal still leaves room for improvement in that many circuits are required while at best a low counting rate can be obtained.

It is therefore an object of the present invention to provide new concepts for solving the problems incidental to the prior art. In other words, it is an object of the present invention to provide an apparatus for stabilizing the amplification degrees of PMT's, which apparatus requires no reference light source for automatically correcting a secular change in the amplification degrees of PMT's to thereby stabilize various characteristics, and which requires a comparatively small number of circuits for collecting data on the amplification degrees of PMT's and yet the data acquisitions for the PMT's can be carried out in parallel with each other so that correction may be effected in a short time.

DISCLOSURE OF THE INVENTION

The apparatus in accordance with the present invention is intended for use in a detector, such as a scintillation camera, for detecting the position of a radioactive ray. The PMT's accommodated therein are classified into a plurality of groups and arranged on the basis of a principle that PMT's falling under the same group should not be disposed adjacently to each other. The apparatus in accordance with the present invention comprises a means for determining the sum of output signals taken from PMT's falling under each group, a means for receiving position signals and thereby determining a specific PMT disposed closest to a position in which a scintillation occurs, a means for carrying out a pulse-height analysis of the sum of output signals taken from a group under which the specific PMT falls, a means for collecting the results of the pulse-height analysis as statistical data on the specific PMT, and means for controlling the amplification degree of the specific PMT or that of an amplifier channel allotted thereto, the control being effected on the basis of the statistical data.

A scintillation occuring around the central axis of a PMT is incident not only upon tat PMT but also upon those surrounding it. However, the largest quantity of light is incident upon the former, while only a small quantity of light is incident upon the adjacent PMT's and a still smaller quantity of light is incident upon the PMT's disposed outside the adjacent PMT's. This finding underlies the present invention. If the PMT's are classified into a plurality of groups and arranged on the basis of a principle that the PMT's falling under the same group should not be disposed adjacently to each other, if the sum of output signals taken from PMT's falling under each group is determined, and if a PMT disposed closest to a position in which a scintillation occurs is determined from the above-mentioned sum, the sum of output signals taken from a group under which the PMT falls can be regarded as an approximate value of an output taken from the PMT alone. Thus the sum of output signals taken from each group provides statistical data on a change in the output of each PMT. In order to stabilize the amplification degrees of PMT's, one has only to have good control, on the basis of the above-mentioned statistical data, over the amplification degree of the PMT's involved, or over that of an amplifier channel allotted thereto.

IDEAL FORM FOR WORKING THE INVENTION

The present invention will become better understood by reference to the following detailed description when considered in connection with the accompanying drawings.

Figure 1:
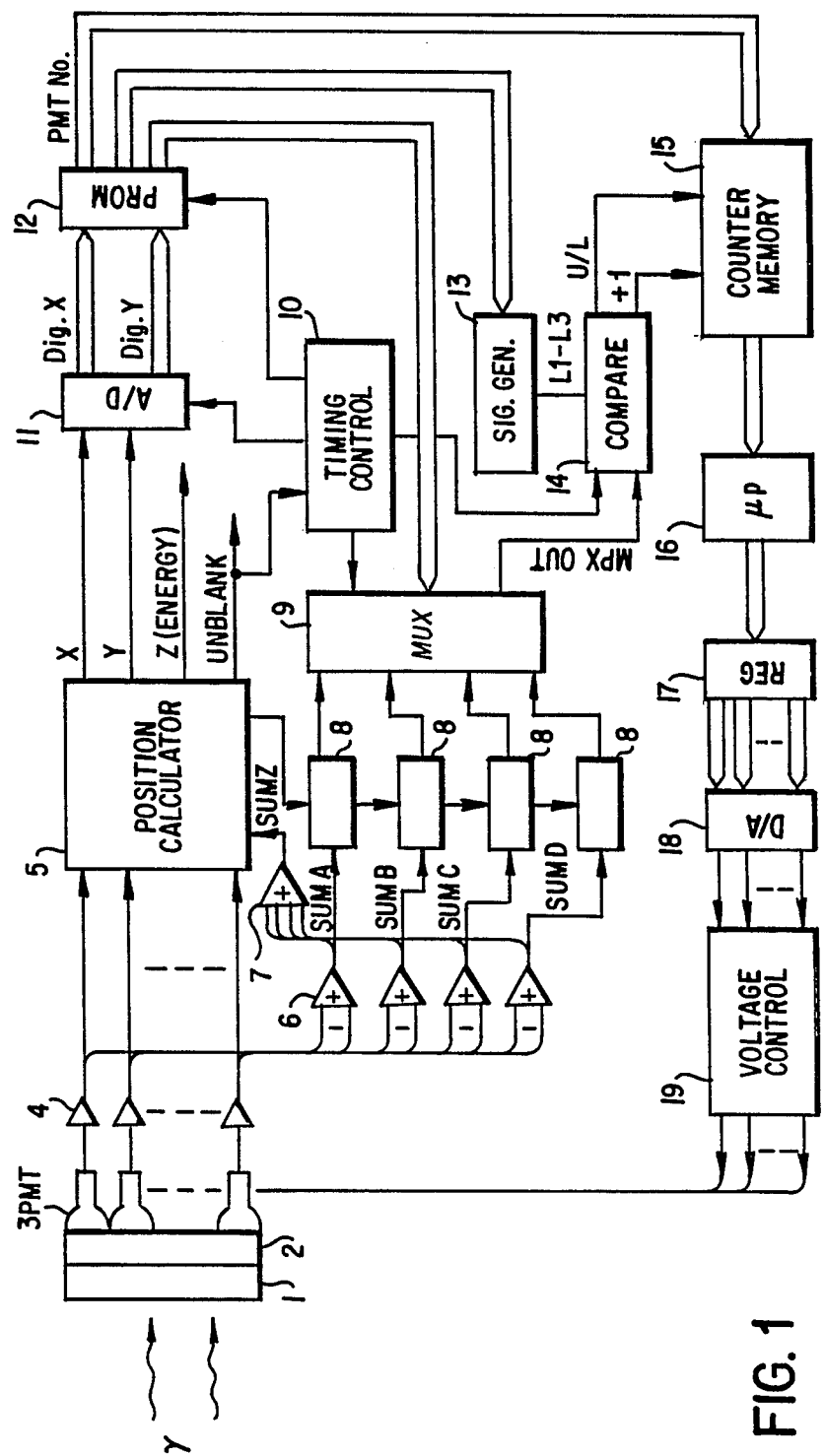
FIG. 1 is a block diagram of an embodiment of the present invention.

FIG. 1 shows an application of the present invention to an ordinary scintillation camera having a scintillator 1, a light guide 2, a plurality of PMT's 3 and preamplifiers 4. A position calculation circuit 5, except for a portion thereof, is also similar to that which is accommodated in an ordinary scintillation camera. The circuit 5 performs position calculation, the pulse-height analysis of energy signals, and timing control. Scintillations occur when gamma rays are incident upon the scintillator 1 through a collimator (not shown) and absorbed by the scintillator 1. Through the light guide 2, scintillation light is guided into the PMT's arranged behind the scintillator 1. The intensity of scintillations is proportional to the energy of gamma rays. In each PMT 3, electrons are released by means of energy supplied by the incidence of light. Electron emission is amplified to such an extent that an output proportional to the quantity of light incident upon each PMT 3 is taken therefrom and converted into a voltage signal in each preamplifier 4. This voltage signal is fed to the position calculation circuit 5. Meanwhile, the largest output is taken from a PMT disposed closest to a position in which a scintillation occurs, because the largest quantity of light is incident upon that PMT. On the basis of this axiom, position signals (analog signals) X and Y are found along the X and Y axes respectively. An energy signal Z is obtained by summing up all the outputs taken from the PMT's 3. An unblanking signal, on the basis of which timing signals are to be developed, is produced when it is ascertained that the energy level of the signal Z falls within desired limits.

Figure 4:
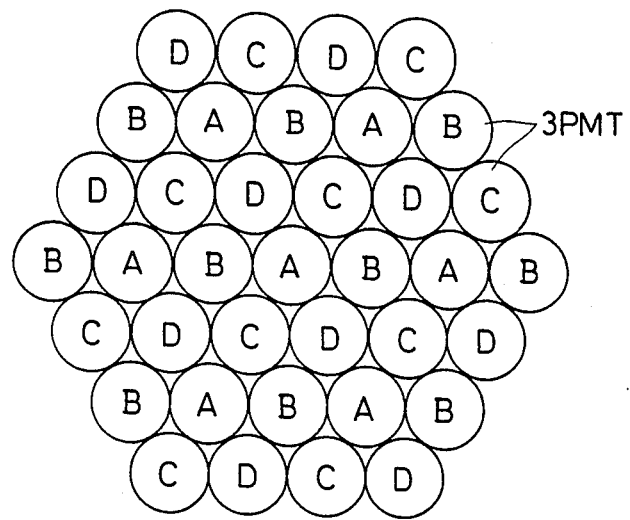
FIG. 4 is a plan view illustrating the arrangement and classification of PMT's.

As shown in FIG. 4, the PMT's are classified into four groups A, B, C and D and arranged on the basis of a principle that the PMT's falling under the same group should not be diposed adjacently to each other. The outputs taken from the preamplifiers 4 are classified according to these four groups and summed up in adders 6 alloted to the respective groups so that sum signals SUM A to SUM D for the respective groups may be obtained. The sum signals SUM A to SUM D are summed up in an adder 7. A sum signal SUM Z taken from the adder 7 is fed to the position calculation circuit 5 and converted into the energy signal Z. The sum signals SUM A to SUM D are fed also to integration-and-delay circuits 8, where they come under the control of the timing signal developed by the position calculation circuit 5 and undergo processing such as integration (or wave modulation), delay and sample holding. The sum signals thus processed are fed to an analog multiplexer 9.

Figure 5:
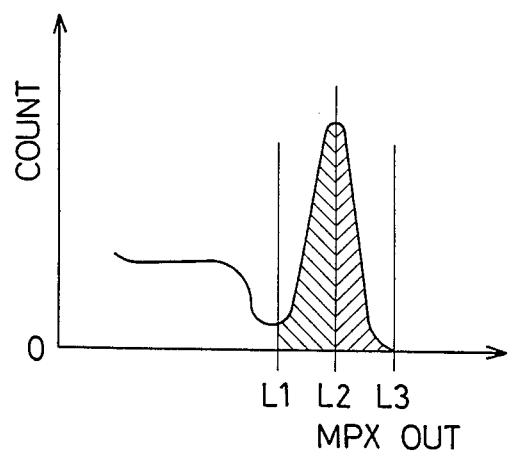
FIG. 5 is a graphical representation of the waveform of an output signal taken from an analog multiplexer used in the apparatus in accordance with the present invention.

The analog position signals X and Y taken from the position calculation circuit 5 are fed to a sample holder/analog-to-digital converter 11 and converted into digital position signals Dig. X and Dig. Y, which are fed to a memory 12 comprising a PROM. When a position in which a scintillation occurs falls in a tuning spot (centering around the central axis of a PMT 3), the PMT 3 disposed closest to the position is specified in terms of position, identification number and grouping. The digital position signals Dig. X and Dig. Y are used as an address for the readout of signals representing the position, identification number and grouping of the closest PMT 3. These signals are fed to the analog multiplexer 9, where they select one from among the four sum signals SUM A to SUM D. The selected one is outputted as a signal MPX OUT and fed to a pulse-height analyzer 14, where the pulse-height of the signal MPX OUT is compared with the pulse-heights of level signals L1 to L3 developed by a level signal generator circuit 13. Then the pulse-height analyzer 14 produces a signal U/L and a timing signal +1. The signal U/L indicates that the pulse-height of the signal MPX OUT falls within the range between the levels L1 and L2 or between the levels L2 and L3. The level signal generator circuit 13 is controlled by signals taken from the memory 12. These signals denote the position of a PMT 3 disposed closest to a position in which a scintillation occurs. The level signals L1 to L3 assume different values according to the position of the PMT 3 (i.e., according to whether it is in the central or peripheral part of the visual field). Let it be supposed that the distribution of the pulse-heights of the signals MPX OUT in a tuning spot should be as shown in FIG. 5 under the condition that the amplifier channel for a PMT 3 disposed closest to the tuning spot has a normal amplification degree. Then the levels L1 to L3 peaking at L2 are preset as shown in FIG. 5. The settings of the levels L1 to L3 may be made adjustable according to nuclides. On the basis of the unblanking signal, a timing control circuit 10 develops timing signals for controlling the sample holder/analog-to-digital converter 11, the memory 12 and the pulse-height analyzer 14. A counter memory 15 comprises a RAM. The identification number given to each PMT 3 and the signal U/L serve as an address for the information stored in the counter memory 15, to which a piece of information is added every time a timing signal +1 is fed to the counter memory 15. The spectrum shown in FIG. 5 slips laterally when the amplification degree of the amplifier channel for the PMT 3 deviates from normalcy. Then a change in the amplification degree can be found either from the difference between the discrete value falling within the limits of L1 to L2 and the discrete value falling within the limits of L2 to L3 or from the ratio of the former to the latter.

Digital data on high voltage to be applied to each PMT 3 are recorded beforehand in a register 17. These digital data are converted into analog signals in a digital-to-analog converter 18 and fed to a high voltage control circuit 19 which controls voltage to be applied to each PMT 3. Information stored in the register 17 is corrected on the basis of data collected in the counter memory 15. This correction is carried out by a data processing circuit 16 comprising a microcomputer.

In order to actually correct the amplification degrees of PMT's 3, the whole of the visula field is exposed to the uniform irradiation of gamma rays from, e.g., a floodlight source. the counter memory 15 carries out calculation for each PMT 3. The irradiation of gamma rays is brought to an end when the results of calculation come up to prescribed values or after the lapse of the prescribed time. From the results obtained in the counter memory 15, a change in the amplification degrees of PMT's can be statistically found for each amplifier channel. Information stored in the register 17 can be corrected by the data processing circuit 16 so as to allow the PMT's 3 to have optimum amplification degrees.

It should be noted that the signal MPX OUT is a sum signal for one of the four groups and this signal is adopted as an approximate value for an output taken from a PMT 3 disposed closest to a position in which a scintillation occurs. The adoption of this approximate value can be justified for the following reason in the case of an ordinary scintillation camera having an optical system comprising a scintillator 1, a light guide 2 and PMT's 3: A scintillation occurring on the central axis of a PMT 3 is incident not only upon that PMT 3 but also upon those surrounding it and causes outputs to be produced by all of them. However, assuming that the output taken from the central PMT 3 is at a level of 100%, then the outputs taken from the adjacent PMT's 3 are at a level of 18 to 20% and those taken from the PMT's 3 disposed outside the adjacent PMT's 3 are only at a level of 3 to 3.5%. Since the PMT's 3 are classified into groups and arranged on the basis of a principle that the PMT's 3 falling under the same group should not be disposed adjacently to each other, and since a sum signal is obtained for each group, it is evident that the output taken from the central PMT 3 predominates overwhelmingly in the sum signal and that the outputs taken from other PMT's 3 falling under the same group as the central PMT 3 are of no account.

Since the PMT's 3 are classified into four groups, the above-described embodiment requires only four integration-and-delay circuits 8. Thus, as compared with the conventional case where it is most common to provide each of a plurality of PMT's with an integration-and-delay circuit, a smaller number of circuits are enough to collect data on outputs produced by PMT's and to obtain a high counting rate.

Figure 2:
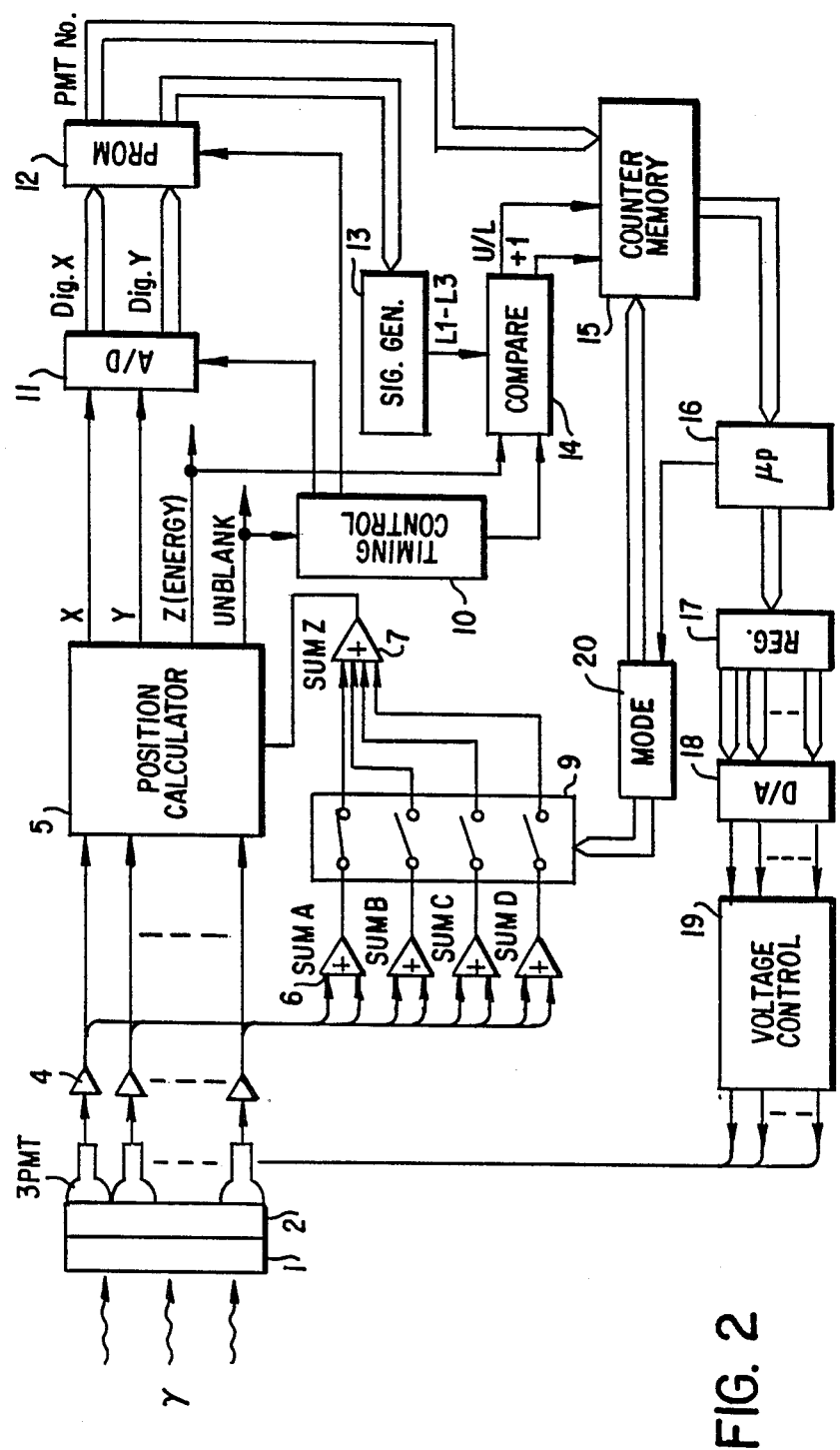
FIGS. 2 and 3 are block diagrams of other embodiments of the present invention.

FIG. 2 shows another embodiment of the present invention applied to a scintillation camera.

In case of the first embodiment shown in FIG. 1, a group which includes a PMT 3 disposed closest to a scintillation is designated as a group from which a signal MPX OUT to be fed to the pulse-height analyzer 14 should be derived. The group is represented by a signal, which is addressed by means of the digital position signals Dig. X and Dig. Y when it is read out of the memory 12. The second embodiment forms a contrast to the first embodiment in that one sum signal after another to be fed to the pulse-height analyzer 14 is selected from among the sum signals for the respective groups so that the amplification degrees of PMT's 3 may be controlled in one group after another. In FIG. 2, like numerals are employed to designate parts similar to those appearing in FIG. 1 and, therefore, explanations for these parts are omitted unless otherwise needed. Sum signals SUM A to SUM D for the respective groups are fed from adders 6 to an adder 7 through an analog switch 9 and summed up in the adder 7. A sum signal SUM 2 taken from the adder 7 is fed to a position calculation circuit 5. The analog switches 9 are controlled by a mode setting device 20. In the ordinary measuring mode (diagnostic mode), all the switches are in the "ON" positions so that all of the sum signals SUM A to SUM D may be forwaded to the adder 7 at a time. In the correction mode, one switch after another is thrown into "ON" position at regular time intervals so that one sum signal after another may be forwarded to the adder 7. Consequently, an energy signal Z taken from the position calculation circuit 5 in the ordinary measuring mode is equivalent to the sum of output signals taken from all the PMT's 3, while an energy signal Z taken from the position calculation circuit 5 in the correction mode is equivalent only to the sum of output signals taken from PMT's falling under one of the four groups. Since the sum signal SUM Z per se is not comprehensive in the correction mode, the window of a pulse-height analyzer accommodated in the position calculation circuit 5 should be either wide or disposed in a low position.

In order to actually correct the amplification degrees of PMT's 3, the mode setting device 20 is set at the correction mode and the whole of the visual field is exposed to the uniform irradiation of gamma rays from, e.g., a floodlight source. Then the mode setting device 20 selects one group after another from among the groups A to D. Let it be supposed that the groups A is selected as shown in FIG. 2. Then the counter memory 15 carries out calculation for each PMT 3 falling under the group A. When the result of calculation comes up to a prescribed value or after the lapse of the prescribed time, a signal developed by the counter memory 15 or the data processing circuit 16 effects a switchover from the analog switch 9 for the group A to that for the group B. Data acquisition in the group A is brought to an end by this switchover, and data acquisition in the group B is started. From the results obtained in the counter memory 15, a change in the amplification degrees of PMT's 3 can be statistically found for each amplifier channel. Information stored in the register 17 can be corrected by the data processing circuit 16 so as to allow the PMT's 3 to have optimum amplification degrees.

On the basis of the construction of this embodiment, a circuit for obtaining data for use in the correction of the amplification degrees of PMT's can be formed merely by modifying the conventional position calculation circuit (especially the energy signal circuit) or by adding a simple circuit.

Figure 3:
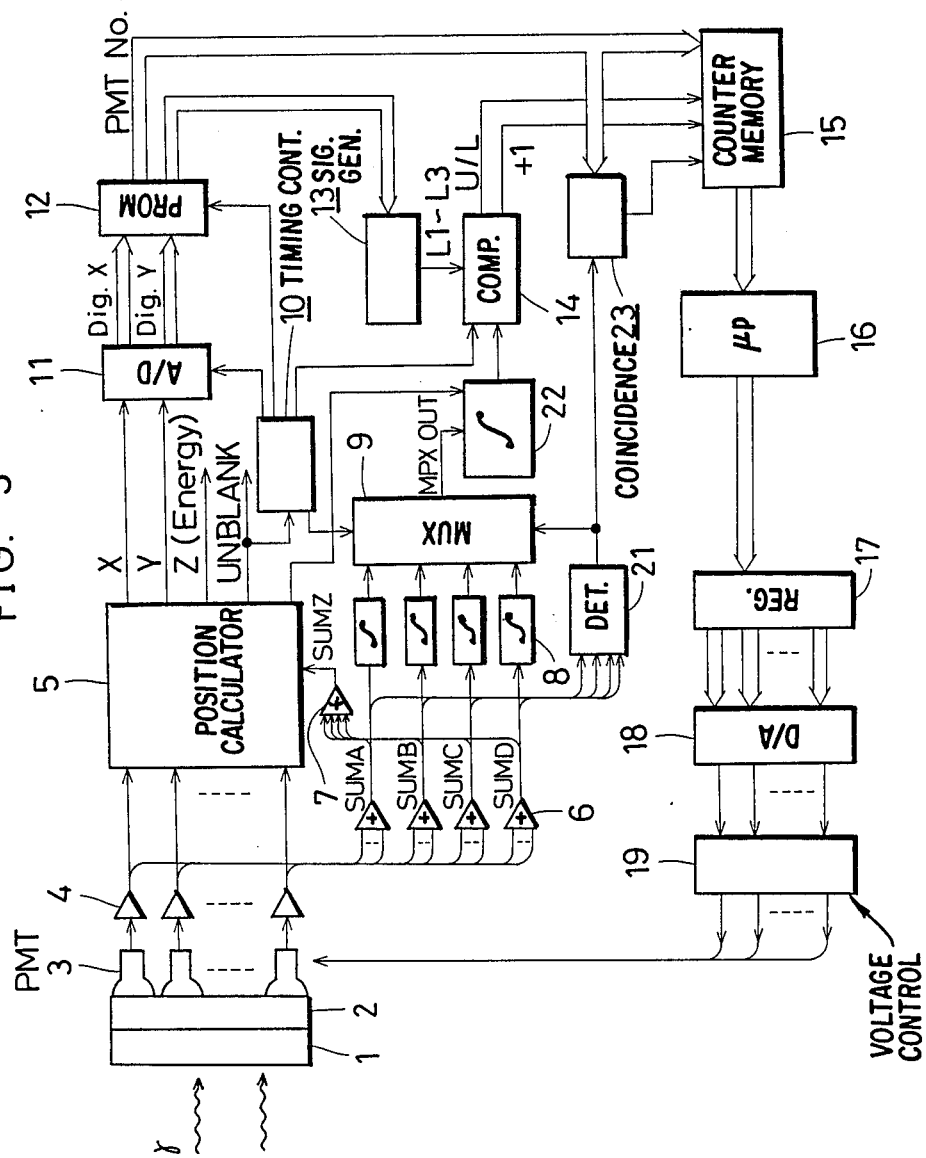

FIG. 3 is a block diagram, illustrating the third embodiment of the present invention applied to a scintillation camera. In FIG. 3, like numerals are employed to designate parts similar to those appearing in FIG. 1.

This embodiment is provided with a means for selecting the largest sum signal from among the sum signals taken from the groups. The largest sum signal thus selected is fed to a pulse-height analyzer 14.

The sum signals SUM A to SUM D for the respective groups are fed from adders 6 to a culmination detector circuit 21. In the circuit 21, a group which has produced the largest sum signal is discriminated from other groups. Then a signal representing the groups is fed from the culmination detector circuit 21 to an analog multiplexer 9, to which the sum signals SUM A to SUM D are also fed through delay circuits 8. In the analog multiplexer 9, the largest sum signal is selected from among these sum signals. The signal taken from the culmination detector circuit 21 takes a part in this selection. An output MPX OUT produced by the analog multiplexer 9 is fed to an integration-and-delay circuit 22, where the output MPX OUT comes under the control of a timing signal developed by a position calculation circuit 5 and undergoes processing such as integration (or wave modulation), delay and sample holding.

The output MPX OUT thus processed is fed to the pulse-height analyzer 14, where the pulse-height of the signal MPX OUT is compared with the pulse-heights of level signals L1 to L3 developed by a level signal generator circuit 13. Then the pulse-height analyzer 14 produces a signal U/L and a timing signal +1. The signal U/L indicates that the pulse-height of the signal MPX OUT falls within the range between the levels L1 and L2 or between the levels L2 and L3.

A coincidence detector circuit 23 prevents a counter memory 15 from carrying out calculation when the identification number of a PMT 3 read out of the memory 12 is contradictory to a group detected by the culmination detector circuit 21 as a group which has produced the largest sum signal. The coincidence detector circuit 23 detects the coincidence of a signal representing the identification number of a PMT 3 read out of the memory 12 with a signal representing the above-mentioned group and controls the counter memory 15 so as to allow it to carry out calculation only when such coincidence occurs.

Except that the analog multiplexer 9 is controlled by the culmination detector circuit 21, the amplification degrees of PMT's 3 are corrected in the same manner as mentioned in connection with the first embodiment shown in FIG. 1. Therefore, explanations for the manner of correction are omitted. In this embodiment, sum signals for the respective groups are compared with each other so that the sum signal of a group, which includes a PMT 3 disposed closest to a scintillation, may be picked out. Each group has only to be provided with a delay circuit 8 for opportunely allowing a sum signal to pass therethrough at the time when a signal is developed by the culmination detector circuit 21. Moreover, this embodiment has only a single integration-and-delay circuit 22 which adjusts the time required for allowing the memory 12 to produce an output and carries out data processing such as integration (or wave modulation) and smple holding. These features serve to improve the counting rate without requiring much concern about is and permit a simple circuit configuration.

It goes without saying that minor variations, such as undermentioned, may be made without departing from the spirit of the invention and the scope of the appended claims.

Firstly, the PMT's 3 may be classified otherwise, although they are classified into four groups A, B, C and D in FIG. 4.

Secondly, the amplification degree of an amplifier channel such as the preamplifiers 4 may be controlled, instead of controlling the amplification degrees of PMT's 3 per se by adjusting the high voltage applied to them.

Thirdly, the adders 6 may be allowed to receive outputs from the preamplifiers 4 through a threshold circuit, instead of directly receiving outputs from the preamplifiers 4 and summing them up for developing sum signals SUM A to SUM D. Only an output taken from a PMT 3 disposed closest to a scintillation is permitted by the threshold circuit to flow in an adder 6, and other outputs are prevented from flowing therein so that a change in the amplification degree of the PMT 3 may be found more strictly.

Fourthly, the memory 12 may not only have a function of receiving position signals X and Y and thereby determining a PMT 3 disposed closest to a scintillation, but also have a function of adjusting the level signals L1 to L3 (or amplifying the signal MPX OUT or the in-comprehensive energy signal) according to the distance between the central axis of the PMT 3 and the position in which the scintillation occurs.

Fifthly, the above-described first embodiment is characterized in that a sum signal for a group which includes a PMT 3 disposed closest to a scintillation is adopted as an approximate value for an output taken from that PMT 3. There is no denying the fact that this approximate value slightly contains the outputs taken from other PMT's 3 falling under the same group as the central PMT 3. In order to find a change in the amplification degrees of PMT's 3 more strictly, a matrix representing these outputs may be inverted and subjected to convolution with data obtained from the counter memory 15.

Sixthly, a system for a scintillation camera adapted to correct the spatial nonlinearity and energy ununiformity of outputs X, Y and Z taken from the position calculation circuit 5 has its own sample holder/analog-to-digital converted and pulse-height analyzer. When the present invention is to be applied to such a system, the sample holder/analog-to-digital converter and the pulse-height analyzer accommodated in the system may take the place of those denoted by the numerals 11 and 14 in the apparatus in accordance with the present invention.

Seventhly, the present invention can be applied not only to a scintillation camera but also to other detectors for detecting the position of a radioactive ray, as far as any of these detectors has one or more scintillators and a plurality of PMT's. A multislice emission type computed tomography scanner (ECT scanner) may be an example of such detectors.

In case of the second embodiment shown in FIG. 2, the signal circuit for the incomprehensive energy signal in the correction mode may be separated from the signal circuit for the incomprehensive energy signal in the ordinary measuring mode.

From the foregoing, it will be apparent that the apparatus in accordance with the present invention can do without a reference light source for the correction of the amplification degrees of PMT's and thereby prevent the deterioration of energy uniformity, spatial resolution and energy resolution.

Data on the amplification degree of each PMT can be collected in parallel with each other so that correction may be effected in a short time.

FILED OF INDUSTRIAL UTILIZATION

The apparatus in accordance with the present invention is useful for automatically stabilizing the amplification degrees of PMT's in a detector for detecting the position of a radiactive ray, said detector comprising a scintillator and a plurality of PMT's. The apparatus can be applied especially to those detectors which accommodate a plurality of PMT's, such as a scintillation camera and an ECT scanner. The amplification degree of each PMT can be stabilized in a short time.

We claim:

1. An apparatus for stabilizing the amplification degrees of photomultipliers in a detector for detecting the position of a radioactive ray, said detector comprising a scintillator, a plurality of photomultipliers arranged behind said scintillator and exposed to light caused by a scintillation occuring in said scintillator, and a position calculation circuit adapted to calculate the position of said scintillation on the basis of outputs taken from said photomultipliers and develop position signals, characterized in that said apparatus comprises:

means for summing up signals relating to said outputs taken from said photomultipliers, said photomultipliers being classified into a plurality of groups and arranged such that photomultipliers falling under the same group are not disposed adjacently to each other, said signals relating to said outputs being summed up for each of said groups so as to be formed into a sum signal for each group;

means responsive to said position signals for determining a specific photomultiplier disposed closest to a position in which a scintillation occurs;

pulse height analyzer means for carrying out a pulse-height analysis of a sum signal taken from a group under which said specific photomultiplier falls;

collecting means responsive to said pulse height analyzer means for collecting the results of said pulse-height analysis as statistical data on said specific photomultiplier; and means responsive to said collecting means for controlling the amplification degree of said specific photomultiplier on the basis of said statistical data.

2. The apparatus as set forth in claim 1, herein switch means, by which one sum signal after another to be fed to said pulse-height analyzer means is selected from among the sum signals for said groups, are interposed between said summing-up means and said pulse-height analyzer means.

3. The apparatus as set forth in claim 1, wherein a means for selecting the largest sum signal from among the sum signals taken from said groups is interposed between said summing-up means and said pulse-height analyzer means.

4. The apparatus as set forth in claim 3, wherein said means for collecting the results of said pulse-height analysis as statistical data is controlled by a means for detecting the coincidence of an output signal taken from said means for determining said specific photomultiplier with a signal representing a group detected by said means for selecting the largest sum signal.

5. The apparatus as set forth in any of claims 1 to 4, wherein said means for determining said specific photomultiplier determines a tuning spot for each photomultiplier.

6. The apparatus as set forth in any of claims 1 to 4, wherein said means for collecting the results of said pulse-height analysis as statistical data is constituted by a counter memory.

* * * * *